US012645060B2

(12) United States Patent
Hormigo et al.

(10) Patent No.: US 12,645,060 B2
(45) Date of Patent: Jun. 2, 2026

(54) SYSTEMS, METHODS AND COMPUTER-ACCESSIBLE MEDIUM FOR VISUAL STIMULATION AND OPTOGENETICS

(71) Applicant: THE TRUSTEES OF COLUMBIA UNIVERSITY IN THE CITY OF NEW YORK, New York, NY (US)

(72) Inventors: Richard Hormigo, New York, NY (US); Rudy Behnia, New York, NY (US); Seyed Navid Mousavi, New York, NY (US); Darcy Peterka, New York, NY (US); Tanya Tabachnik, New York, NY (US)

(73) Assignee: THE TRUSTEES OF COLUMBIA UNIVERSITY IN THE CITY OF NEW YORK, New York, NY (US)

( * ) Notice: Subject to any disclaimer, the term of this patent is extended or adjusted under 35 U.S.C. 154(b) by 0 days.

(21) Appl. No.: 18/384,201

(22) Filed: Oct. 26, 2023

(65) Prior Publication Data

US 2024/0142757 A1 May 2, 2024

Related U.S. Application Data

(60) Provisional application No. 63/419,513, filed on Oct. 26, 2022.

(51) Int. Cl.
*G01N 21/00* (2006.01)
*G01N 21/64* (2006.01)
(Continued)

(52) U.S. Cl.
CPC ......... *G02B 21/0048* (2013.01); *G01N 21/64* (2013.01); *G02B 21/0032* (2013.01); *G02B 21/0076* (2013.01); *H05B 45/10* (2020.01)

(58) Field of Classification Search
CPC ................ G01N 21/64; G02B 21/0032; G02B 21/0048; G02B 21/0076; H05B 45/10
See application file for complete search history.

(56) References Cited

U.S. PATENT DOCUMENTS

2021/0063964 A1* 3/2021 Marshel ............... G03H 1/2294

OTHER PUBLICATIONS

B. Hohman "LED light source: major advance in fluorescence microscopy," Biomed Instrum Technol. Nov. 2007; 41(6): pp. 461-464.

(Continued)

*Primary Examiner* — Dani Fox
(74) *Attorney, Agent, or Firm* — Hunton Andrews Kurth LLP

(57) ABSTRACT

Exemplary systems, method and compute-accessible medium can be provided, e.g., for a visual stimulation or an optogenetic activation during a scan of at an object. For example, it is possible to utilize a controller which can be configured to receive signal information regarding the scan, and to precisely control a light engine. The exemplary control of the light engine can be used to activate and deactivate a light source or a plurality of light sources (e.g., one or more at least one light emitting diodes). using the signal information. For example, a digital micromirror device can be utilized through which the light engine is precisely controlled for a full field projection, or patterned projection, wherein the light engine can comprise up to eight high power light sources.

26 Claims, 13 Drawing Sheets

(51) Int. Cl.
    *G02B 21/00*         (2006.01)
    *H05B 45/10*         (2020.01)

(56)              References Cited

OTHER PUBLICATIONS

DF. Albeanu, et al. "LED arrays as cost effective and efficient light sources for widefield microscopy," PLoS One. May 2008; 3(5): e2146.

KY Kwon et al., "Design, fabrication, and packaging of an integrated, wirelessly-powered optrode array for optogenetics application," Frontiers in Systems Neuroscience, vol. 9, May 2015.

A. Battefeld et al., "A versatile and Open-Source rapid LED switching system for One-Photon imaging and Photo-Activation,"Frontiers in Cellular Neuroscience, vol. 12, Jan. 2019.

MJ. Zimmermann et al., "LED Zappelin': An open source LED controller for arbitrary spectrum visual stimulation and optogenetics during 2-photon imaging," HardwareX, vol. 8, Jul. 2020.

CJ Chang-Hasnain et al., "High-contrast gratings for integrated optoelectronics," Advances in Optics and Photonics vol. 4 / Issue 3, pp. 379-440, Sep. 2012.

J. Zhang et al., "A high-efficiency quasi-two-stage LED driver with multichannel outputs," IEEE Transactions on Industrial Electronics, vol. 64 / Issue 7, pp. 5875-5882, Mar. 2017.

P. Ricci et al., "Power-effective scanning with AODs for 3D optogenetic applications," Journal of Biophotonics vol. 15 / Issue 4, Apr. 2022.

* cited by examiner

100

200

205

SYSTEMS, METHODS AND COMPUTER-ACCESSIBLE MEDIUM FOR VISUAL STIMULATION AND OPTOGENETICS

CROSS REFERENCE TO RELATED APPLICATION(S)

This application relates to and claims the benefit of priority from U.S. Provisional Patent Application No. 63/419,513, filed on Oct. 26, 2022, the entire disclosure of which is incorporated herein by reference in its entirety.

STATEMENT REGARDING FEDERALLY FUNDED RESEARCH

This invention was made with government support under Grant No R01EY029311, awarded by the NIH. The government has certain rights in the invention.

FIELD OF THE DISCLOSURE

The present disclosure relates generally to the technology of microscopy, and more particularly, to systems, methods and computer-accessible medium for visual stimulation and optogenetics.

BACKGROUND INFORMATION

Separation of fluorescence responses from optical stimulation during 2-photon imaging is critical to the capture of high fidelity, low-noise neural data. While many conventional solutions for presenting visual stimulations during in vivo imaging experiments rely on optical filters, tedious screening, or both, they generally offer only partial solutions, with artifacts appearing in the recorded movies Thus, there is a need to address and/or improve such and other issues and/or deficiencies which exist in the previous systems and methods.

SUMMARY OF EXEMPLARY EMBODIMENTS

Such issues and/or deficiencies can at least be partially addressed and/or overcome by providing systems, methods and computer-accessible medium for visual stimulation and optogenetics by providing exemplary embodiments according to the present disclosure.

According to an exemplary embodiment of the present disclosure, an exemplary system for visual stimulation and optogenetics can be provided. For example, the exemplary system can comprise a light engine, and a controller configured to control the light engine. The light engine can comprise a plurality of light sources. The plurality of light sources can comprise at least one light emitting diode (LED). The light engine can be a multispectral light engine. The system can further comprise a digital micromirror device through which the light engine is precisely controlled for a full field projection, or patterned projection, wherein the light engine can comprise up to eight high power light sources. The light engine can comprise eight LEDs and the controller can be configured to independently drive each of the eight LED outputs up to 2 Ampere (A) each, with a milliamp precision throughout an entire current range of the light engine. According to certain exemplary embodiments of the present disclosure, the light engine can be modulated through external analog signals.

The exemplary system can further comprise a microscope, wherein the controller can be configured to interface with the microscope to allow for flexible strobing only during line-reversals or flyback to minimize interference in functional imaging measurements, which is accomplished by a synchronous timing scheme with microsecond accuracy. The microscope can be a two-photon microscope. The controller can contain processing circuits that detect and automatically synchronize to the microscope's scanner timings to simplify incorporation into imaging workflows. The light engine can be configured to allow visual neuroscientists to span a large range of organism's color gamut. The light engine can comprise a plurality of light sources, and the controller can be configured to receive a blanking signal to turn off the plurality of light sources.

In still additional exemplary embodiments of the present disclosure, the controller can be configured to analyze a horizontal scanning waveform and generate a blanking waveform to turn off the plurality of light sources to minimize light bleed through, within microsecond timescales. The blanking times can be modified by navigable menu in display on the front panel or using parameters within the code. The controller can be configured to use the blanking signal to minimize crosstalk between the plurality of light sources illumination and the fluorescence of indicators including GCaMP. Each LED has a constant current setting and a separate fast modulation input that sets the current from 0 to a maximum setting for each channel using analog voltages while maintaining frequency responses over 1 MHz. The controller can comprise a current comparator circuit, controlling a high power MOSFET. The modulation can be processed by a 10 MHz op-amp that is shut down by a separate FET switch when blanking is required. The controller can further be configured to dynamically adjust the timing to match and track that of an external system.

Accordingly to yet another exemplary embodiment of the present disclosure, an exemplary method for visual stimulation and optogenetics can be provided. For example, the method can be implemented in a system for visual stimulations and optogenetic activation. The system can comprise a light engine and a controller configured to control the light engine. The method can comprise: controlling, by the controller, the light engine to stimulate an object; controlling, by the controller, the light engine to perform a full field projection, or patterned projection on the object through a digital micromirror device; independently driving, by the controller, each light source output of the light engine with milliamp precision; modulating, by the controller, the light engine through external analog signals; interfacing, by the controller, with a two-photon microscope to facilitate a flexible strobing only during line-reversals or flyback to minimize interference in functional imaging measurements; automatically synchronizing, by the controller, to the two-photon microscope's scanner timings; and turning off, by the controller, the light engine by receiving a blanking signal.

According to still another exemplary embodiment of the present disclosure, a non-transitory, computer-readable medium for visual stimulations and optogenetic activation can be provided. For example, the computer-accessible medium can comprise instructions that, when executed on a system comprising a light engine and a controller configured to control the light engine, cause the system to perform actions comprising controlling, by the controller, the light engine to stimulate an object, controlling, by the controller, the light engine to perform a full field projection, or patterned projection on the object through a digital micromirror device; independently driving, by the controller, each light source output of the light engine with milliamp precision. It further possible to modulate, by the controller, the light engine through external analog signals; interfacing, by the controller, with a two-photon microscope to facilitate a flexible strobing only during line-reversals or flyback to minimize interference in functional imaging measurements; automatically synchronizing, by the controller, to the two-photon microscope's scanner timings; and turning off, by the controller, the light engine by receiving a blanking signal.

According to still further exemplary embodiments of the present disclosure, systems, methods and computer-accessible medium can be provided for a visual stimulation or an optogenetic activation during a scan of at an object. For example, it is possible to utilize a controller which can be configured to receive signal information regarding the scan, and to precisely control a light engine which activates and deactivates a light source using the signal information.

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

Further objects, features and advantages of the present disclosure will become apparent from the following detailed description taken in conjunction with the accompanying Figures showing illustrative embodiments of the present disclosure, in which.

Figure 1:
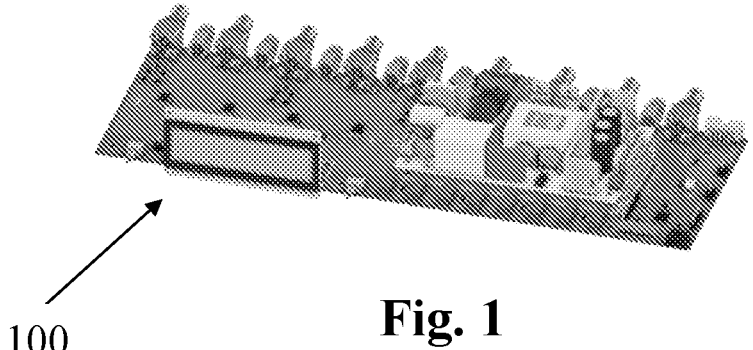
FIG. 1 is an illustration of an exemplary multi-channel light emitting diode (LED) controller tailored for optogenetics and visual stimulation that can also operate as a general-purpose controller according to an exemplary embodiment of the present disclosure.

Throughout the drawings, the same reference numerals and characters, unless otherwise stated, are used to denote like features, elements, components or portions of the illustrated embodiments. Moreover, while the present disclosure will now be described in detail with reference to the figures, it is done so in connection with the illustrative embodiments and is not limited by the certain exemplary embodiments illustrated in the figures and the appended claims.

DETAILED DESCRIPTION OF EXEMPLARY EMBODIMENTS

The following description of exemplary embodiments provides non-limiting representative examples referencing numerals to particularly describe features and teachings of different aspects of the present disclosure. The exemplary embodiments described should be recognized as capable of implementation separately, or in combination, with other exemplary embodiments from the description of the exemplary embodiments. A person of ordinary skill in the art reviewing the description of the exemplary embodiments should be able to learn and understand the different described aspects of the present disclosure. The description of the exemplary embodiments should facilitate understanding of the invention to such an extent that other implementations, not specifically covered but within the knowledge of a person of skill in the art having read the description of embodiments, would be understood to be consistent with an application of the exemplary embodiments of the present disclosure.

According to various exemplary embodiments of the present disclosure, a multispectral light engine and controller for visual stimulation(s) can be provided and/or utilized that can also be used for flexible optogenetic activation. The exemplary system, method and computer-accessible medium can be used and/or designed to, e.g., precisely control up to eight high power light sources for full field projection, or patterned projection through a digital micro-mirror device. Using the exemplary controller, it is possible to independently drive each of the eight LED outputs, e.g., up to 2 Ampere each (and possibly higher), with milliamp precision and little ripple, throughout the entire current range, and can be modulated through one or more external analog signals. While many conventional solutions for presenting visual stimulations during in vivo imaging experiments rely on optical filters, tedious screening, or both, they generally offer only partial solutions, with artifacts appearing in the recorded movies.

It is possible to utilize and/or design the exemplary controller according to the exemplary embodiments of the present disclosure to interface with two-photon microscopes to facilitate a flexible strobing only during line-reversals or flyback to minimize interference in the functional imaging measurements, which can be accomplished by a synchronous timing scheme with microsecond accuracy. For example, the exemplary controller can include one or more processing circuits that can detect and dynamically and automatically synchronize to the microscope's scanner timings to simplify incorporation into many imaging workflows. Given its flexible design, combined with a custom stimulus design package, the disclosed light engine of exemplary embodiments can allow visual neuroscientists to span a large range of most organism's color gamut, without sacrificing imaging quality. In addition, the same or similar exemplary methodology can be implemented during many and/or all optical configurations.

As described herein, the exemplary separation of fluorescence responses from optical stimulation during 2-photon imaging can be important to the capture of high fidelity, low-noise neural data. According to exemplary embodiments of the present disclosure, a multiple-channel (e.g., 8-channel) LED driver can be provided which can be tailored for optogenetics and visual stimulation that can also work as a general-purpose controller. The blanking features of the exemplary controller can reduce or minimize crosstalk between the LED illumination and the fluorescence of indicators such as GCaMP. Additionally, the fast and high resolution constant current drivers can provide accurate and linear LED illuminations. An illustration of an exemplary multi-channel light emitting diode (LED) controller 100 tailored for optogenetics and visual stimulation is shown in FIG. 1 that can also work as a general-purpose controller according to an exemplary embodiment of the present disclosure.

Figure 2:
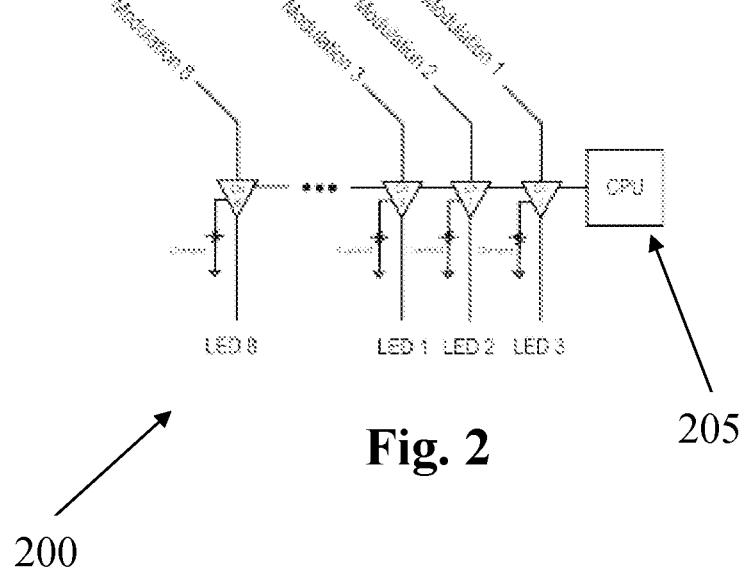
FIG. 2 is an exemplary circuit diagram of a multi-channel light emitting diode (LED) controller tailored for optogenetics and visual stimulation that can also operate as a general-purpose controller according to an exemplary embodiment of the present disclosure.

As described herein, a low-cost flexible multispectral light engine and controller according to certain exemplary embodiments of the present disclosure can be provided for visual stimulation and optogenetics. FIG. 2 shows a circuit diagram 200 of a multi-channel light emitting diode (LED) controller tailored for optogenetics and visual stimulation according to exemplary embodiments of the present disclosure that can also operate as a general-purpose controller. For example, each of the LEDs 1-8 shown in FIG. 2 can have a constant current setting and a separate fast modulation input 1-8 of the respective LEDs 1-8 that sets the current from 0 to the maximum setting for each channel using analog voltages while maintaining frequency responses over 1 MHz. The central processing unit (CPU) 205 can be a relatively simple STM32 (Cortex-M4F) processor. It may be inexpensive and run up to the 125 MIPS range. The drivers can be composed of or include a simple current comparator circuit which can be used to control a high power metal-oxide-semiconductor field-effect transistor (MOSFET). The exemplary driver modulation can be processed by, e.g., a 10 MHz op-amp that can be shut down by a separate FET switch when blanking is required.

Figure 3:
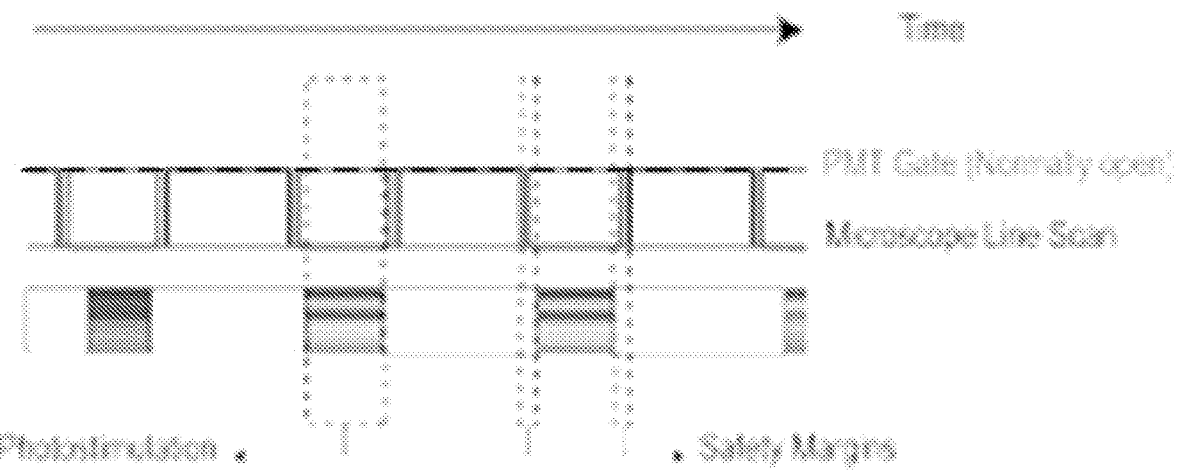
FIG. 3 is an exemplary timing diagram of a synchronous bus that can be used to blank the LEDs during the retrace periods of galvo mirrors according to an exemplary embodiment of the present disclosure.

According to certain exemplary embodiments of the present disclosure, when provided with a blanking signal, some, most or all channels can be turned off. In an example shown in FIG. 3—which illustrates a timing diagram of a synchronous bus that can be used to blank the LEDs during the retrace periods of galvo mirrors according to an exemplary embodiment of the present disclosure—the synchronous bus can be processed out of the horizontal galvanometer synchronization, and can be used to blank the LEDs during the retrace periods of the galvo mirrors. The exemplary embodiments of the systems, methods and computer-accessible medium described herein can be fast enough to analyze the horizontal scanning waveform and generate a blanking waveform to shut down the LEDs a few μsec before the scanning starts, and can restore illumination a few μsec after scanning ends to minimize light bleed-through, within micro-second timescales that can be defined by a user. For example, one or more of the light sources of an exemplary light engine can be turned on based on the control signals from the microscope's scanner, and specifically during the time when it is not being scanned. Additionally, exemplary systems, methods and computer-accessible medium according to the exemplary embodiments the present disclosure can generate a signal to gate the microscope detector if such functionality is available. For example, blanking times, and other parameters, according to exemplary embodiments, can be modified by navigable menu in display on the front panel or using parameters within the code. In some embodiments, blanking times may be defined by software and dynamically controlled. The exemplary systems, methods and computer-accessible medium described herein can also be implemented for resonant scan mirrors.

Figure 4:
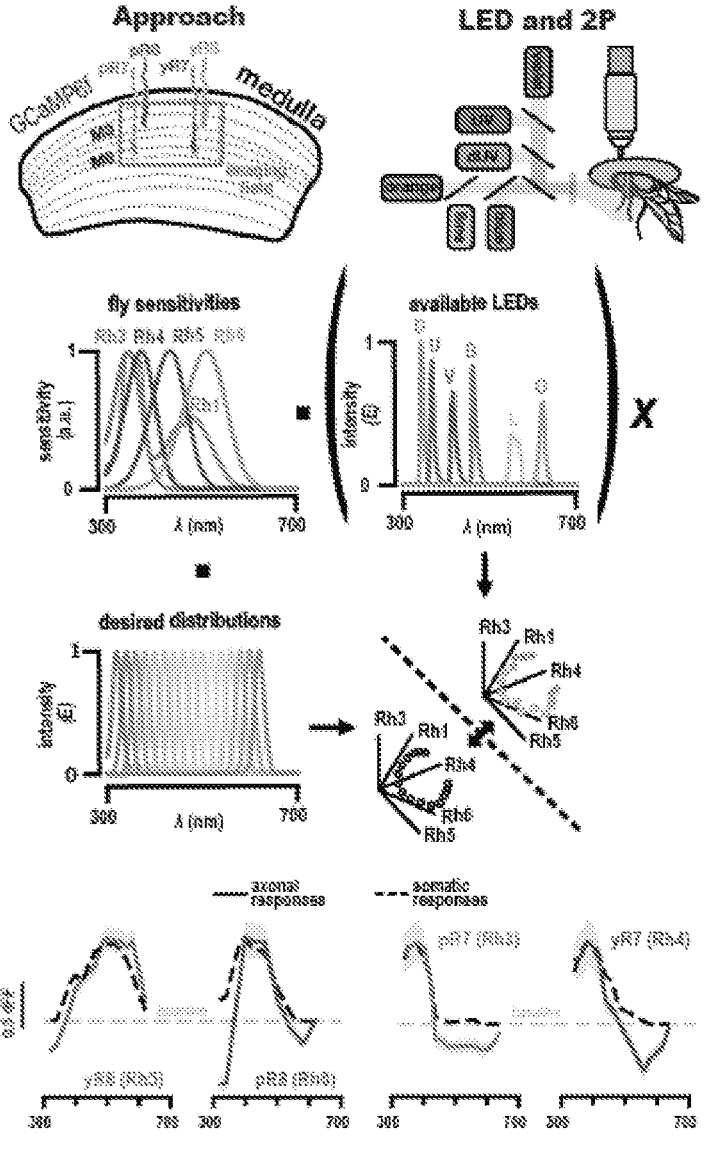
FIG. 4 is a set of illustrations and diagrams of an exemplary single wavelength reconstruction for a fruit fly using six LEDs according to an exemplary embodiment of the present disclosure.

FIG. 4 shows a set of exemplary illustrations and diagrams of a single wavelength reconstruction for a fruit fly using six LEDs according to another exemplary embodiment of the present disclosure. As illustrated in FIG. 4, using the blanking ability of the exemplary light engine shown therein and described herein, it is possible, according to exemplary embodiments of the present disclosure, e.g., to stimulate the fly eye using a combination of LEDs and record the activity of neurons in vivo using a two photon microscope. Using the exemplary hardware and animal agnostic computational package, e.g., dreye (see, e.g., Christenson, et al. 2022, BioRxiv), the responses of photoreceptor axons to LED mixtures can be measured that span the single wavelength manifold in the fly color space. Due to the LED blanking in exemplary embodiments, the signal-to-noise ratio of the recorded imaging movies can be increased more than 30-fold, and may be able to measure clear opponent responses in single axon terminals (see Heath, Christenson, et al. 2020, Current Biology).

Figure 5:
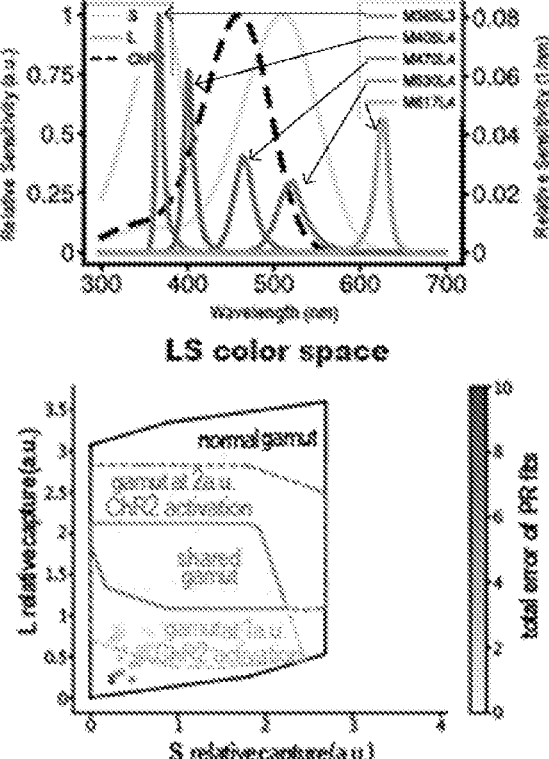
FIG. 5 is a set of graphs for an exemplary utilization of the stimulator in conjunction with the dreye package, e.g., an optogenetic and visual stimulation of the mouse retina according to yet exemplary embodiment of the present disclosure.

For example, the exemplary stimulator in conjunction with, e.g., the dreye package can have other uses. For example, FIG. 5 shows an exemplary set of graphs of an exemplary utilization of the stimulator in conjunction with the dreye package, e.g., optogenetic and visual stimulation of the mouse retina according to yet exemplary embodiment of the present disclosure. As illustrated in FIG. 5, the exemplary light engine can be used to excite photoreceptors, while isolating the contribution of ChR2-expressing neurons. It can find planes in the L and S cone mouse color space that correspond to different activations of the ChR2. In this conceptual example, five LEDs can be used to reconstruct a large gamut of mouse colors, while being able to switch between two different magnitudes of ChR2 activation. This exemplary procedure can also be used with other optogenetic tools whose sensitivities overlap heavily with an animal's photoreceptor sensitivities. It should be understood that other software, packages, procedures can be used in accordance to the exemplary embodiments of the present disclosure.

According to exemplary embodiments of the present disclosure, a multichannel light (e.g., LED) synchronous controller driver can be provided that can control high power LEDs that can be used for visual stimulations and/or flexible photostimulation and optogenetic activation. The system in the exemplary implementation can be designed to precisely control the intensity and timing of activation of up to eight high power light sources. Such exemplary controller can independently drive each of the eight LED outputs with up to 2 Ampere each, with milliamp precision regulation and very little power ripple, throughout the entire current range, and can be modulated through external analog signals. The exemplary controller can interface with laser scanning microscopes to allow for flexible strobing during line-reversals or flyback to minimize light interference or contamination in the functional imaging measurements. This can be accomplished by a synchronous timing scheme with microsecond accuracy critically, the controller contains processing circuits that detect and automatically synchronize to the microscope's scanner timings to simplify incorporation into many imaging workflows. While there are other conventional alleged "solutions" for presenting visual stimulations during in vivo imaging experiments rely on optical filters, tedious screening, or both, they generally offer only partial solutions, with artifacts appearing in the recorded movies.

As described herein, the conventional technology typically uses optical filtering to avoid interference with recorded wavelengths and uses signal gating on flyback with discrete components, which can offer only partial solutions, with artifacts appearing in the recorded movies. In contrast, the exemplary embodiments of the system and method described herein can precise external light source control that minimizes signal contamination in functional microscopy. The exemplary system and method described herein can simplify and automate flyback synchronization and control, and can compensate for LED rise and decay times. The system and method disclosed herein can also provide high power LED driving with precise timing and modulation control.

The exemplary embodiments of the present disclosure can provide an exemplary system for visual stimulation and optogenetics, for example, a system for a visual stimulation or an optogenetic activation during a scan of at least one object, which can comprise: a controller configured to (i) receive signal information regarding the scan, and (ii) precisely control a light engine which activates and deactivates a light source using the signal information. As another example, the exemplary system can comprise a light engine; and a controller configured to control the light engine. The light engine can comprise a plurality of light sources which can comprise at least one light emitting diode (LED). The light engine can be a multispectral light engine.

The exemplary system can further comprise a digital micromirror device through which the light engine is precisely controlled for a full field projection, or patterned projection, wherein the light engine can comprise up to eight high power light sources. The light engine can comprise eight LEDs and the controller can be configured to independently drive each of the eight LED outputs up to 2 Ampere (A) each, with a milliamp precision throughout an entire current range of the light engine. The light engine can be modulated through external analog signals. The exemplary system can further comprise a microscope, wherein the controller can be configured to interface with the microscope to receive the signal information regarding the scan being performed by the microscope to allow for flexible strobing only during line-reversals or flyback to minimize interference in functional imaging measurements, which is accomplished by a synchronous timing scheme with a microsecond accuracy. The flexible strobing can be effectuated by the synchronous timing scheme with the microsecond accuracy. Specifically, the controller can be configured to interface with the microscope to receive the signal information regarding the scan being performed by the microscope, and to control the light engine to provide selectable, automatic or configurable reduced time window to activate the strobing only during line-reversals or flyback so as to reduce an interference in functional imaging measurements.

The exemplary microscope can be a two-photon microscope. The exemplary controller can contain processing circuits that detect and automatically synchronize to the microscope's scanner timings to simplify incorporation into imaging workflows. For example, the exemplary controller can contain one or more processing circuits that are configured to detect and automatically synchronize to a timing of a scanner of the microscope. The light engine can be configured to allow visual neuroscientists to span a large range of organism's color gamut. The exemplary light engine can comprise a plurality of light sources, and the controller can be configured to receive a blanking signal to turn off the plurality of light sources.

The controller can be configured to analyze a horizontal scanning waveform and generate a blanking waveform to turn off the plurality of light sources to minimize light bleedthrough, within microsecond timescales. The blanking times can be modified by navigable menu in display on the front panel or using parameters within the code. The controller can be configured to use the blanking signal to minimize crosstalk between the plurality of light sources illumination and the fluorescence of indicators including GCaMP. Each LED has a constant current setting and a separate fast modulation input that sets the current from 0 to a maximum setting for each channel using analog voltages while maintaining frequency responses over 1 MHz. The controller can comprise a current comparator circuit (e.g., a plurality of adjustable constant-current MOSFET driver circuits), controlling a high power MOSFET. The modulation can be processed by a 10 MHz op-amp that is shut down by a separate FET switch when blanking can be needed required.

According to further exemplary embodiments of the present disclosure, a method for visual stimulation and optogenetics can be provided. For example, a method for a visual stimulation or optogenetic activation can comprise e.g., generating a scan of at least one object, and providing signal information regarding the scan; and controlling a light source using the signal information regarding the scan to activate and deactivate the light source using the signal information to stimulate the at least one object. As another example, the exemplary method can be implemented in a system for visual stimulations and optogenetic activation, and the exemplary system can comprise a light engine and a controller configured to control the light engine.

The exemplary method can comprise (i) controlling, by the controller, the light engine to stimulate an object, (ii) controlling, by the controller, the light engine to perform a full field projection, or patterned projection on the object through a digital micromirror device, (iii) independently driving, by the controller, each light source output of the light engine with milliamp precision, (iv) modulating, by the controller, the light engine through external analog signals, (v) interfacing, by the controller, with a two-photon microscope to allow for/facilitate flexible strobing only during line-reversals or flyback to minimize interference in functional imaging measurements, (vi) automatically synchronizing, by the controller, to the two-photon microscope's scanner timings; and turning off, by the controller, the light engine by receiving a blanking signal. The exemplary method may further include iterating the generation and control by using multiple signal information. By being flexible, the controller can be configured to interface with the microscope to receive the signal information regarding the scan being performed by the microscope, and to control the light engine to provide selectable, automatic or configurable reduced time window to active the strobing only during line-reversals or flyback so as to reduce an interference in functional imaging measurements.

The present disclosure can also provide a non-transitory, computer-readable medium for visual stimulations and optogenetic activation can be provided. For example, the computer-accessible medium can comprise instructions that, when executed on a system comprising a light engine and a controller configured to control the light engine, cause the system to perform actions performing the exemplary methods described herein. For example, a non-transitory computer-readable medium for a visual stimulation or an optogenetic activation which includes instructions that, when executed on a computer configuration, can cause the computer configuration to perform procedures comprising, e.g., effectuating a generation of a scan of at least one object, and providing signal information regarding the scan; and controlling a light source using the signal information regarding the scan to activate and deactivate a light source using the signal information to stimulate the at least one object.

Figure 6:
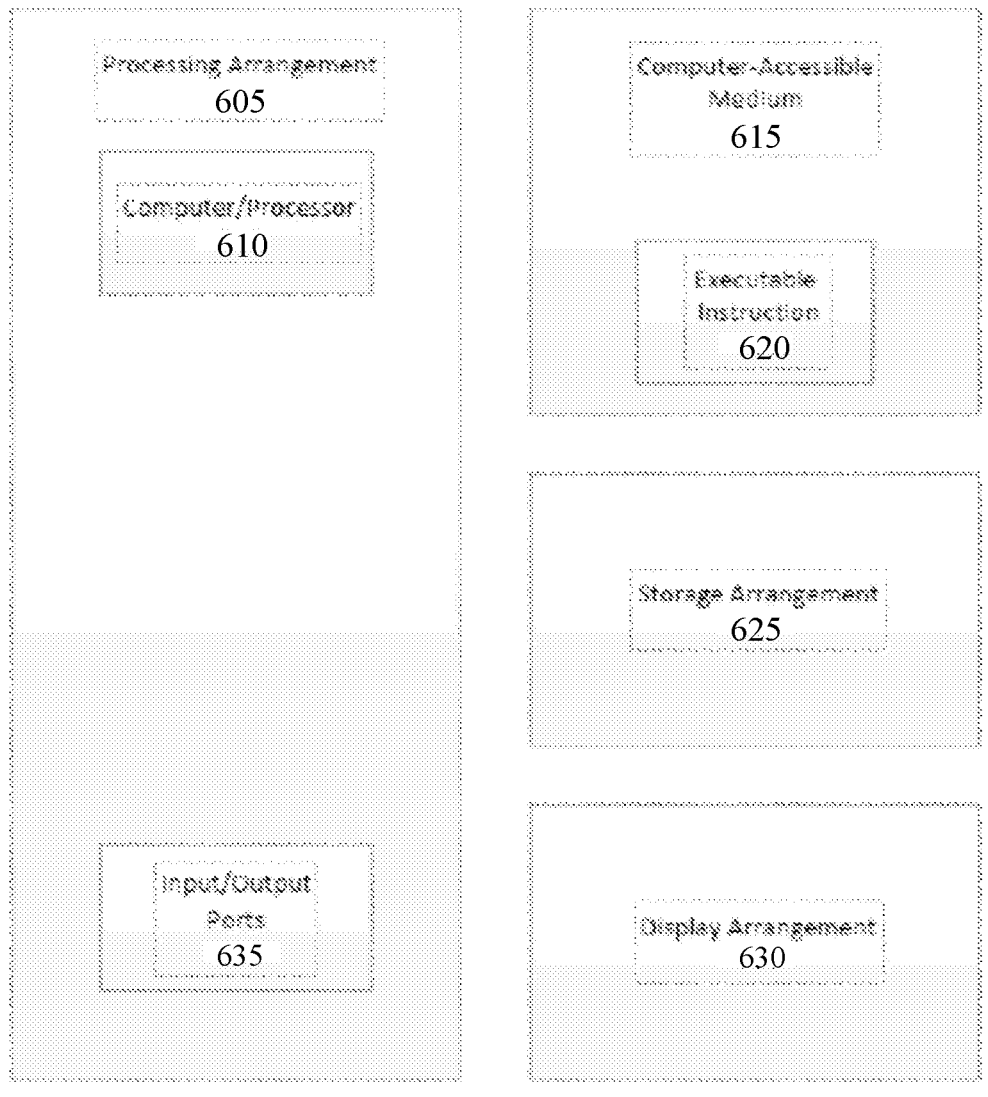
FIG. 6 is an illustration of an exemplary block diagram of an exemplary system in accordance with certain exemplary embodiments of the present disclosure.

FIG. 6 shows a block diagram of an exemplary embodiment of a system according to the present disclosure. For example, exemplary procedures in accordance with the present disclosure described herein can be performed by a processing arrangement and/or a computing arrangement (e.g., computer hardware arrangement) 605. Such processing/computing arrangement 605 can be, for example entirely or a part of, or include, but not limited to, a computer/processor 610 that can include, for example one or more microprocessors, and use instructions stored on a computer-accessible medium (e.g., RAM, ROM, hard drive, or other storage device).

As shown in FIG. 6, for example a computer-accessible medium 615 (e.g., as described herein above, a storage device such as a hard disk, floppy disk, memory stick, CD-ROM, RAM, ROM, etc., or a collection thereof) can be provided (e.g., in communication with the processing arrangement 605). The computer-accessible medium 615 can contain executable instructions 620 thereon. In addition or alternatively, a storage arrangement 625 can be provided separately from the computer-accessible medium 615, which can provide the instructions to the processing arrangement 605 so as to configure the processing arrangement to execute certain exemplary procedures, processes, and methods, as described herein above, for example. Further, the exemplary processing arrangement 605 can be provided with or include an input/output ports 635, which can include, for example a wired network, a wireless network, the internet, an intranet, a data collection probe, a sensor, etc. As shown in FIG. 6, the exemplary processing arrangement 605 can be in communication with an exemplary display arrangement 630, which, according to certain exemplary embodiments of the present disclosure, can be a touch-screen configured for inputting information to the processing arrangement in addition to outputting information from the processing arrangement, for example. Further, the exemplary display arrangement 630 and/or a storage arrangement 625 can be used to display and/or store data in a user-accessible format and/or user-readable format.

Figure 7:
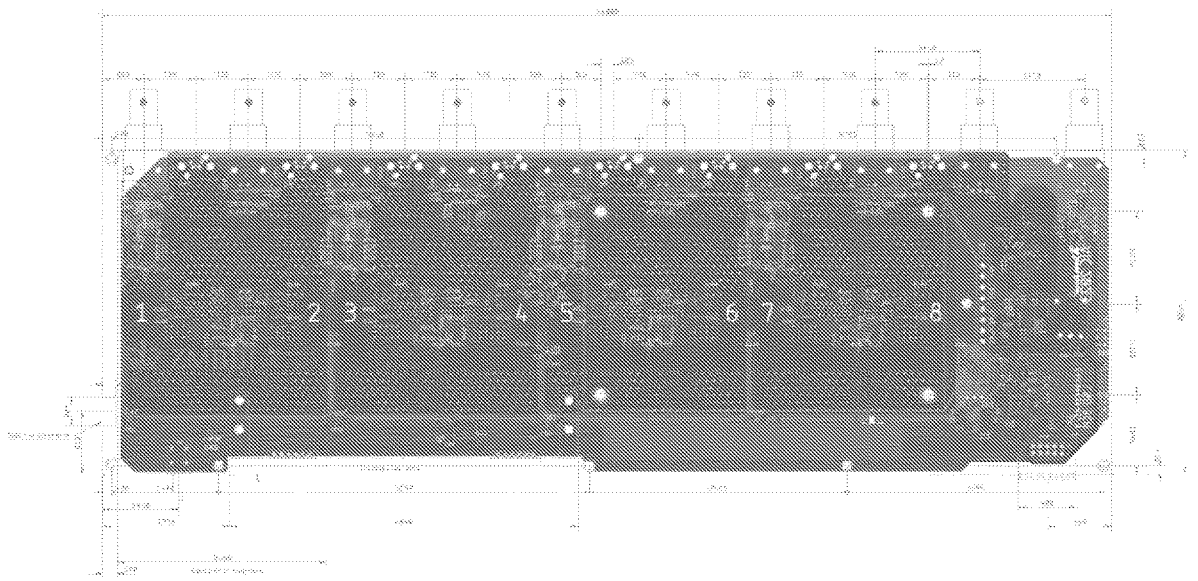
FIG. 7 illustration of an exemplary multi-channel light emitting diode (LED) controller tailored for optogenetics and visual stimulation that can also operate as a general-purpose controller according to an exemplary embodiment of the present disclosure.
Figure 8A:
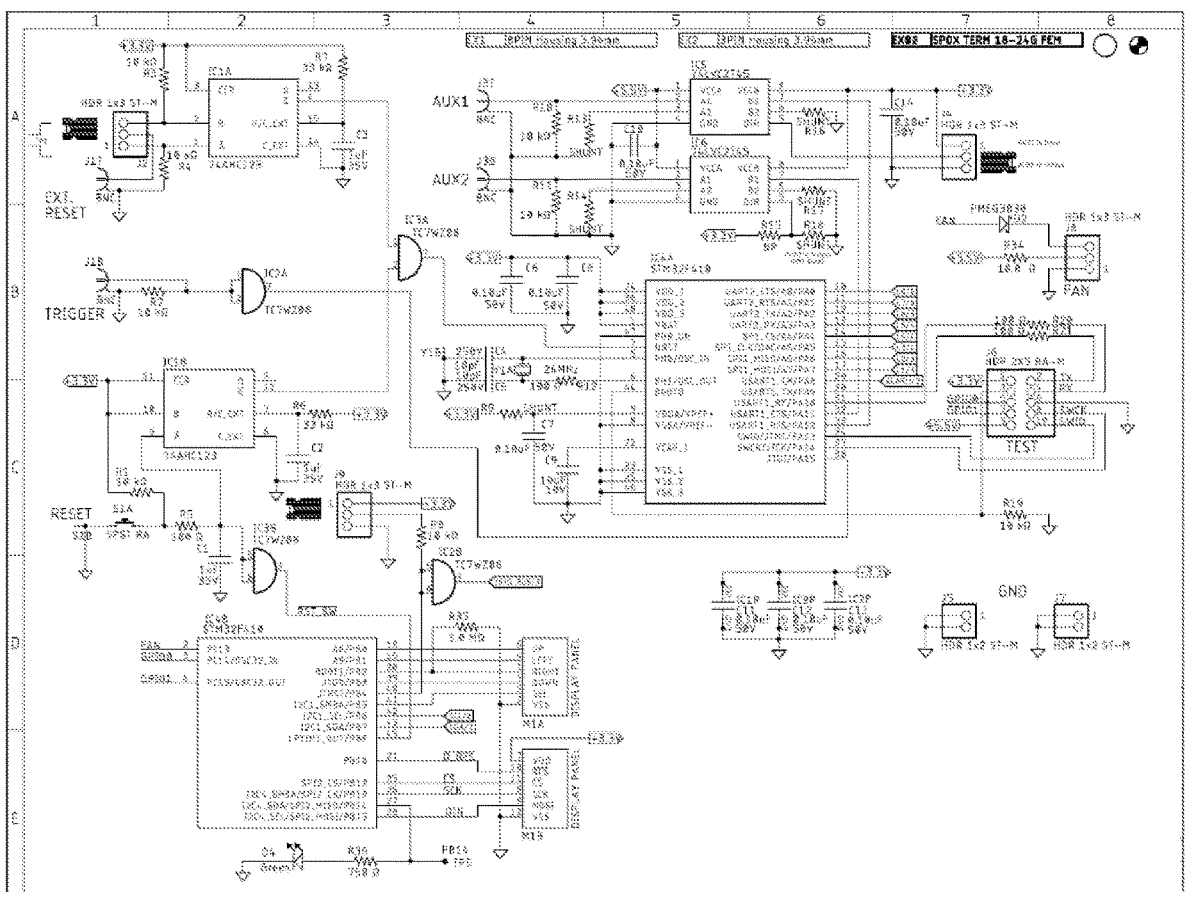
FIGS. 8*a-f* are exemplary circuit schematics of a multi-channel light emitting diode (LED) controller tailored for optogenetics and visual stimulation that can also operate as a general-purpose controller according to an exemplary embodiment of the present disclosure.
Figure 8B:
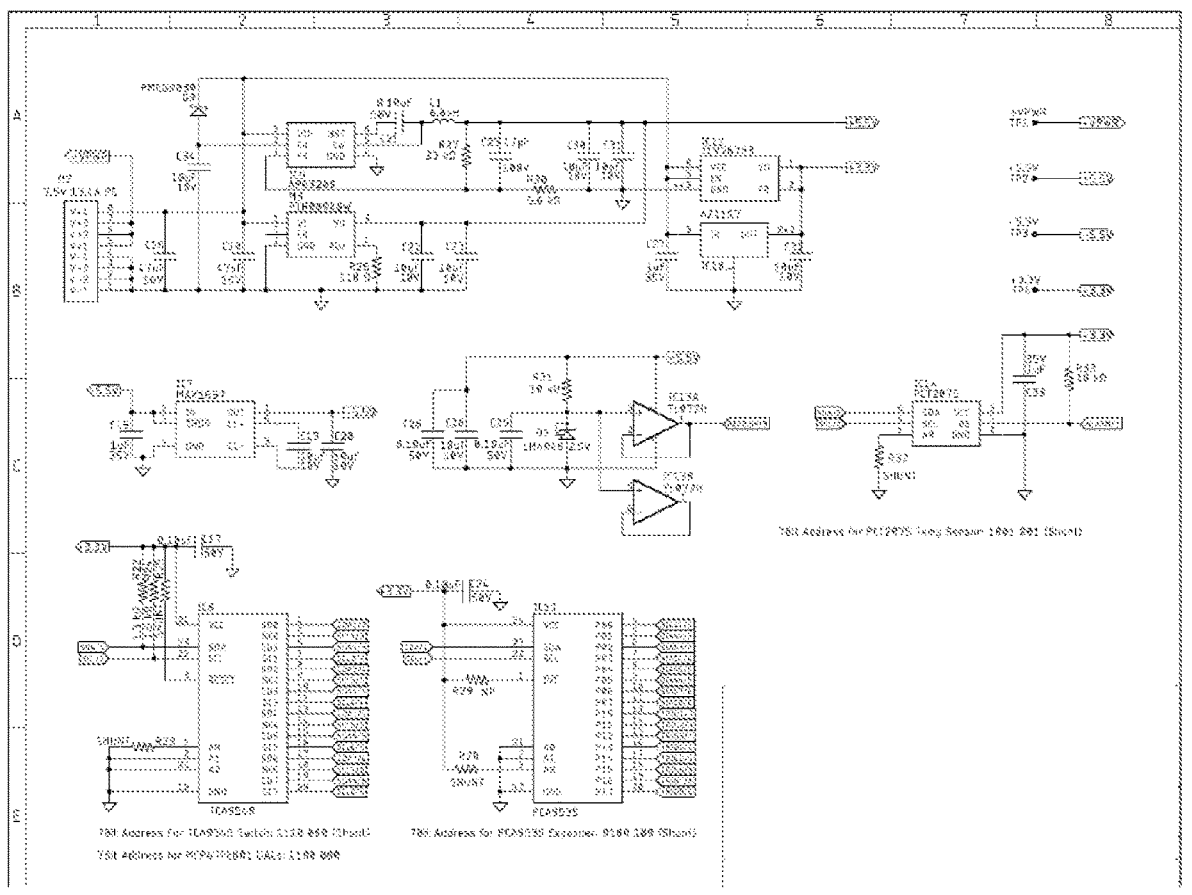
Figure 8C:
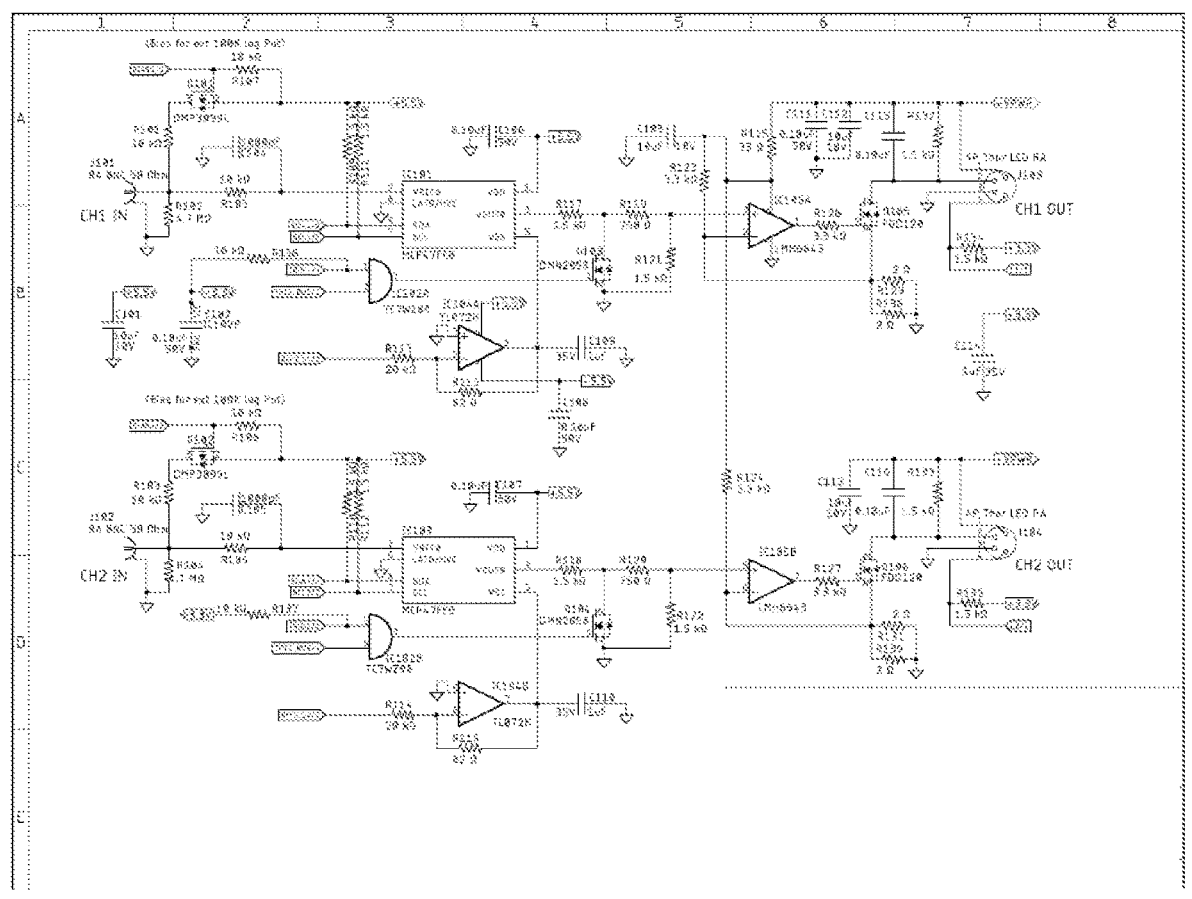
Figure 8D:
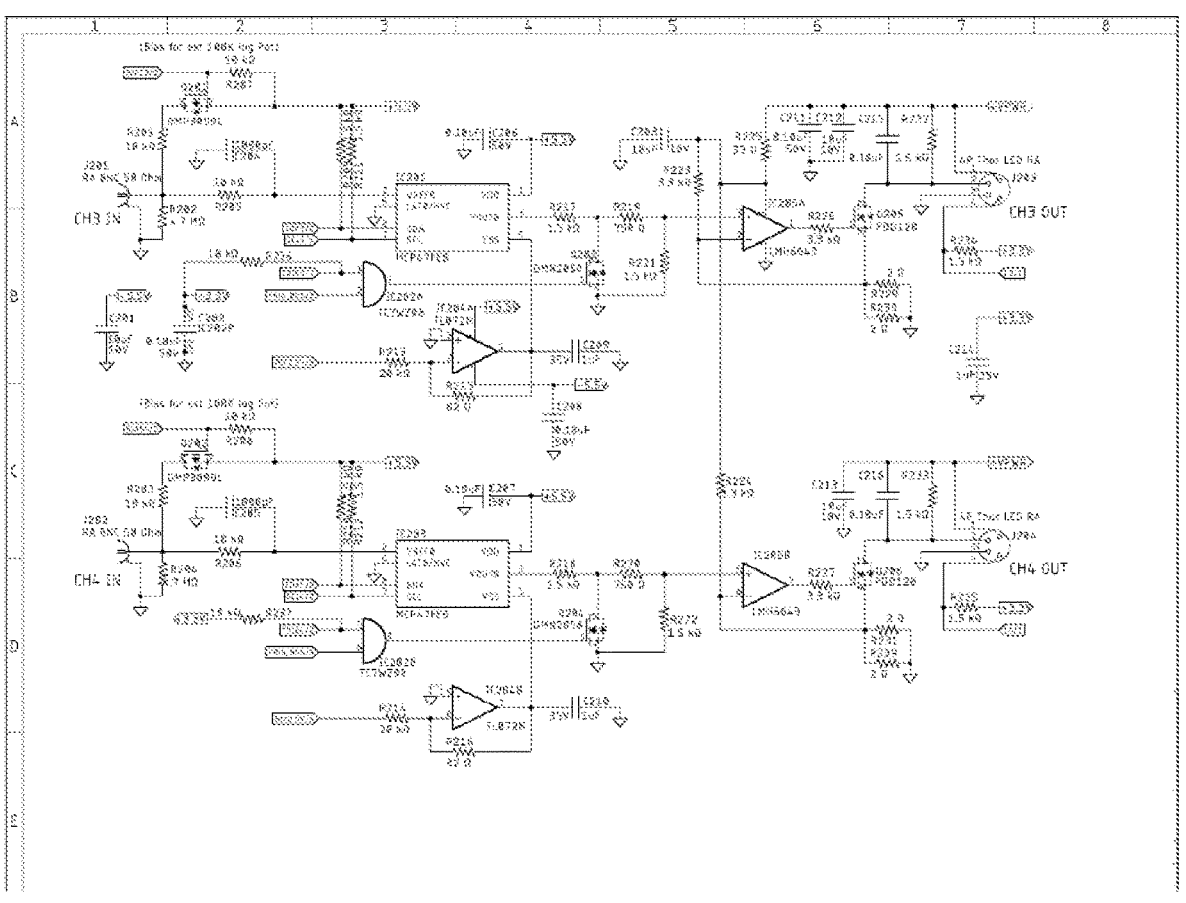
Figure 8E:
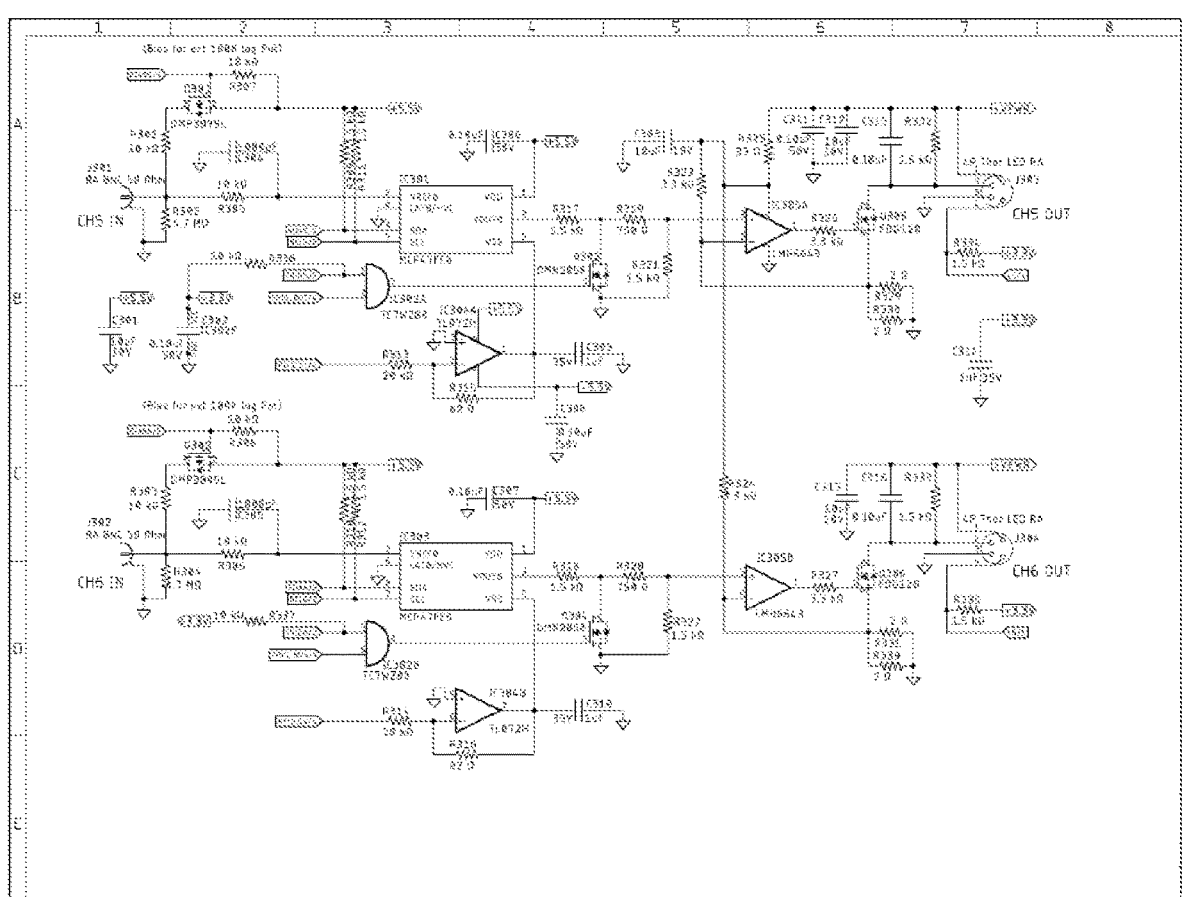
Figure 8F:
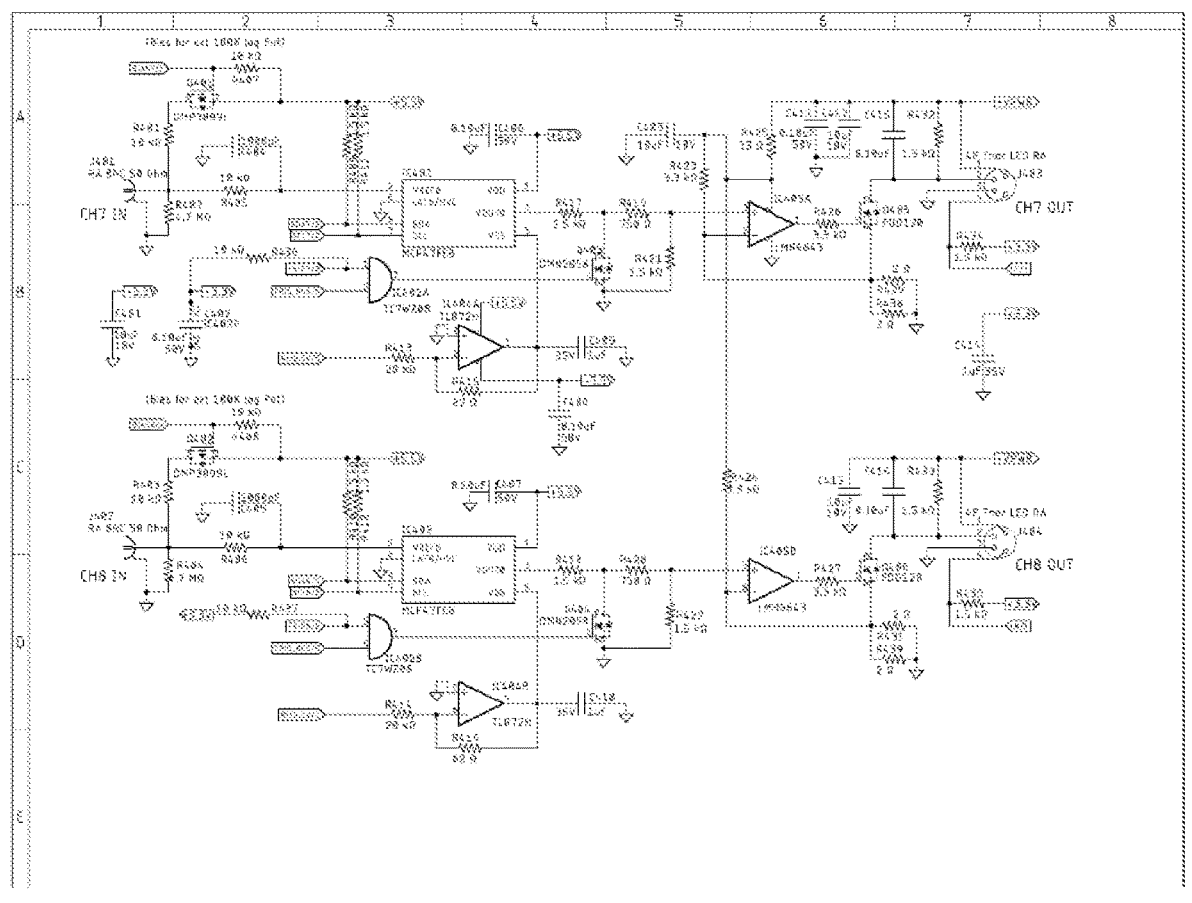

With respect to FIG. 7, the controller may be fabricated in accordance with the current revision of IPC-6012, class 2. The circuit may be made from FR4 Tg 15 or equivalent, can be RoHS compliant and halogen free. FIGS. 8*a-f* illustrate an exemplary circuit diagram used in conjunction with embodiments of the present disclosure. These exemplary controller and circuits are in no way limiting thereto or to the methods, systems and computer-accessible medium according to the exemplary embodiments of the present disclosure described herein.

Exemplary embodiments of the present disclosure can include a dimming mode that allows the channels to be used as a generic dimmer for LEDs. Moreover, exemplary embodiments of the present disclosure can also include a plug and play feature that identifies and adjusts the LED current limit dynamically. This can include a step to query external LED system's firmware to automatically set the allowable range of currents. Further exemplary embodiments may include standard potentiometer support in modulation inputs for dimmer feature. Finally, exemplary embodiments may include a photomultiplier tube disable signal when LEDs are on, and may be considered a dynamic gating feature that can supply a trigger/gate that allows for control/veto of external devices.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures which, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. In addition, certain terms used in the present disclosure, including the specification and drawings, can be used synonymously in certain instances, including, but not limited to, for example, data and information. It should be understood that, while these words, and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

Throughout the disclosure, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

In this description, numerous specific details have been set forth. It is to be understood, however, that implementations of the disclosed technology can be practiced without these specific details. In other instances, well-known methods, structures and techniques have not been shown in detail in order not to obscure an understanding of this description. References to "some examples," "other examples," "one example," "an example," "various examples," "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrases "in one example," "in one exemplary embodiment," or "in one implementation" does not necessarily refer to the same example, exemplary embodiment, or implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for a visual stimulation or an optogenetic activation during a scan of at least one object, comprising:
a controller configured to (i) receive signal information regarding the scan, and (ii) precisely control a light engine which activates and deactivates a light source using the signal information.

2. The system of claim 1, wherein the light engine comprises a plurality of light sources.

3. The system of claim 2, wherein the plurality of light sources comprise at least one light emitting diode (LED).

4. The system of claim 1, wherein the light engine is a multispectral light engine.

5. The system of claim 1, further comprising a digital micromirror device which is coupled to and precisely controls the light engine for a full field projection or a patterned projection, wherein the light engine comprises up to eight high power light sources.

6. The system of claim 1, wherein the light engine comprises a plurality of light emitting diodes (LEDs), and wherein the controller is configured to independently drive each of the LED outputs up to 2 Ampere, with a milliamp precision throughout an entire current range of the light engine.

7. The system of claim 6, wherein each of the LEDs has a constant current setting and a fast modulation input that sets the current from 0 to a maximum setting for each channel using analog voltages while maintaining frequency responses over 1 MHz.

8. The system of claim 1, wherein the controller controls the light engine by modulating the light engine using external analog signals.

9. The system of claim 8, wherein the modulation is processed by a 10 MHz op-amp that is shut down by a separate FET switch when blanking is required.

10. The system of claim 1, wherein the strobing is effectuated by a synchronous timing scheme with a microsecond accuracy.

11. The system of claim 1, further comprising a microscope, wherein the controller is configured to interface with the microscope to receive the signal information regarding the scan being performed by the microscope, and to control the light engine to provide selectable, automatic or configurable reduced time window to activate the strobing only during line-reversals or flyback so as to reduce an interference in functional imaging measurements.

12. The system of claim 11, wherein the microscope is a two-photon microscope.

13. The system of claim 11, wherein the controller comprises one or more processing circuits that are configured to detect and automatically synchronize to a timing of a scanner of the microscope.

14. The system of claim 1, wherein the light engine comprises a plurality of light sources, and wherein the controller is configured to receive a blanking signal to turn off the plurality of light sources.

15. The system of claim 14, wherein the controller is configured to analyze a horizontal scanning waveform and generate a blanking waveform to turn off the plurality of light sources to reduce light bleed-through, within microsecond timescales.

16. The system of claim 14, wherein the controller is configured to provide blanking times for the plurality of light sources which are modifiable by a navigable menu in display on the front panel or using parameters within the code.

17. The system of claim 14, the controller is configured to use the blanking signal to reduce crosstalk between an illumination of the plurality of light sources and the fluorescence of indicators including GCaMP.

18. The system of claim 1, wherein the controller comprises a plurality of adjustable constant-current metal oxide semiconductor field-effect transistor (MOSFET) driver circuits which are configured to control a high power MOSFET.

19. The system of claim 1, wherein the controller is configured to dynamically adjust a timing of a scanner to match and track that of an external system.

20. A method for a visual stimulation or optogenetic activation, comprising:
generating a scan of at least one object, and providing signal information regarding the scan; and
controlling a light source using the signal information regarding the scan to activate and deactivate the light source using the signal information to stimulate the at least one object.

21. The method of claim 20, further comprising:
controlling the light source to perform a full field projection or a patterned projection on the object using a digital micromirror device.

22. The method of claim 20, further comprising:
independently driving, by a controller, each output of a light engine associated with the light source with a milliamp precision; and
modulating, by the controller, the light engine through external analog signals.

23. The method of claim 20, further comprising:
interfacing, by the controller, with a two-photon microscope to provide selectable, automatic or configurable reduced time window to activate the strobing only during line-reversals or flyback to reduce an interference in functional imaging measurements;
automatically synchronizing, by the controller, to scanner timings of the two-photon microscope; and
turning off, by the controller, the light engine by receiving a blanking signal.

24. The method of claim 20, further comprising:
iterating the generation and control by using multiple signal information.

25. The method of claim 1, further comprising dynamically adjusting the scanner timings to match and track that of an external system.

26. A non-transitory computer-readable medium for a visual stimulation or an optogenetic activation which includes instructions that, when executed on a computer configuration, cause the computer configuration to perform procedures comprising:

effectuating a generation of a scan of at least one object, and providing signal information regarding the scan; and controlling a light source using the signal information regarding the scan to activate and deactivate a light source using the signal information to stimulate the at least one object.

\* \* \* \* \*